Sept. 17, 1957 J. C. ALRICH 2,807,003

TIMING SIGNAL GENERATION

Filed April 14, 1955 2 Sheets-Sheet 1

INVENTOR.
JOHN C. ALRICH
BY
Christie, Parker & Hale
ATTORNEYS

Sept. 17, 1957 J. C. ALRICH 2,807,003

TIMING SIGNAL GENERATION

Filed April 14, 1955 2 Sheets-Sheet 2

INVENTOR.
JOHN C. ALRICH

BY

Christie, Parker & Hale
ATTORNEYS

United States Patent Office 2,807,003
Patented Sept. 17, 1957

2,807,003

TIMING SIGNAL GENERATION

John C. Alrich, Altadena, Calif., assignor, by mesne assignments, to Burroughs Corporation, Detroit, Mich., a corporation of Michigan Application April 14, 1955, Serial No. 501,305

6 Claims. (Cl. 340—174)

This invention relates to an improved method and apparatus for generating timing signals, and more particularly, to an improved method and apparatus for generating a plurality of sets of timing signals from a single recording channel.

In digital computers and data processing machinery, it is frequently necessary to generate a plurality of sets of timing signals for synchronizing the various operations to be performed. For example, where digital signals are recorded on a recording medium, such as a magnetic drum or the like, the locations or addresses of the recorded digital information must be identified. Commonly, a timing signal track is included which carries indicia for marking the location of the digital positions. From the timing track may be derived a signal train which is accurately synchronized with the digital positions.

In addition, it is commonly required that there be one or more timing signal tracks for identifying groups of digital positions in which may be recorded a block of digital information, and where the recording medium is cyclical in nature, it is commonly required that there be a timing track for identifying a reference location, sometimes termed the "origin."

In previous systems, a single timing track and a separate transducer have been required for each set of timing signals to be generated except where the timing signals have been a multiple or sub-multiple of the rate of repetition of a recorded timing signal. Reference is made to the co-pending application entitled "Timing Pulse System," Foster et al., Serial No. 431,793, filed May 24, 1954, in which there is described one form of apparatus for generating timing signals from a plurality of timing tracks.

In accordance with the present invention, there is provided an improved method and apparatus for generating a plurality of sets of timing signals from indicia recorded on a single timing track. In one embodiment of the invention, periodically recurrent signals are recorded along a storage medium, at least one flag signal is interspersed with the periodically recurrent signals, a signal train is derived in accordance with the signals recorded on the storage medium, portions of the signal train corresponding to the periodically recurrent signals are gated to one output, and selected portions of the signal train are gated to a second output in accordance with the flag signals.

A better understanding of the invention and its advantages may be had upon a reading of the following detailed description when taken in conjunction with the drawings, in which.

Figure 1:
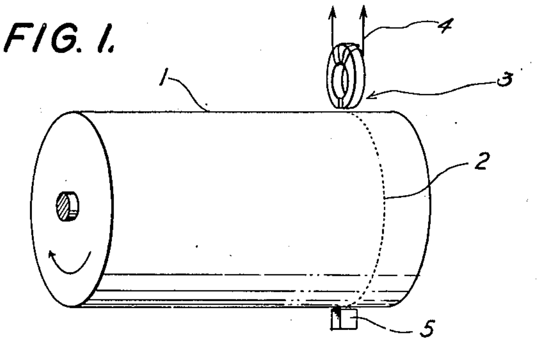
Fig. 1 shows a rotatable drum having a magnetizable periphery upon which may be recorded the timing signal indicia of the present invention.

In Fig. 1 there is shown one type of storage medium upon which may be recorded indicia for generating timing signals. The apparatus of Fig. 1 comprises a rotatable drum 1, having a magnetizable periphery. Surrounding one end of the magnetic drum is a timing track 2, adjacent to which is located a transducer 3. The transducer 3 may comprise a conventional magnetic recording and reproducing head which is adapted to change the condition of magnetization of the periphery of the magnetic drum 1 along the timing track 2 in response to electrical signals during a writing operation, and is adapted to sense changes in magnetization of the periphery of the magnetic drum 1 along the timing track 2 during a reading operation.

In some instances it is desirabel to have the timing track permanently recorded on the drum. One way in which the timing track may be permanently recorded on the drum is to engrave marks in the surface of the drum corresponding to the location of the timing indicia. By placing a small permanent magnet 5 adjacent the drum, the permanent magnet will magnetize the surface of the drum along the timing track. As the timing track passes under the transducer 3, the flux density varies with each engraved mark, thereby providing the corresponding change in the electrical signal generated in the winding 4 of the transducer 3. Thus, a signal train may be generated by the transducer 3 in accordance with indicia recorded along the timing track 2.

Figure 2:
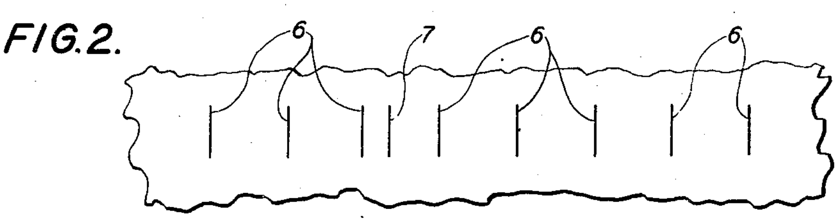
Fig. 2 is a diagrammatic illustration of a timing track which may be included in the apparatus of Fig. 1.

Fig. 2 shows a section of the timing track of a magnetizable drum having a plurality of equally spaced marks 6 which are adapted to provide a signal train from the transducer 3, comprising periodically recurrent timing signals. In addition, the timing track of Fig. 2 includes an extra flag mark 7 which, when passed beneath the transducer 3, causes a flag signal to be generated which is interspersed in time with respect to the periodically recurrent timing signals produced by the equally spaced marks 6.

Figure 4:
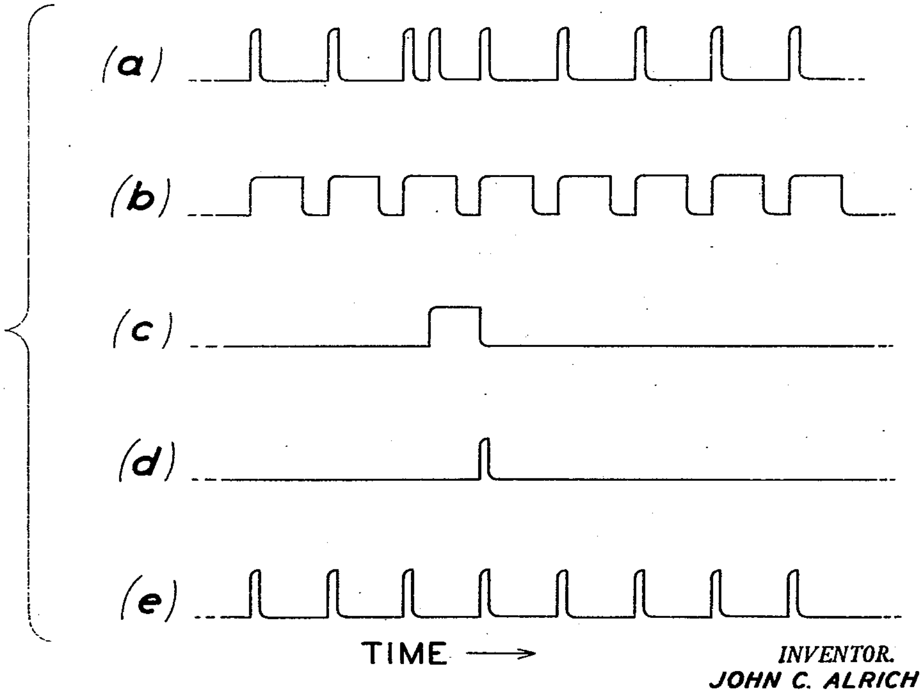
Fig. 4 is a set of graphical illustrations of electrical signals occurring in the apparatus of Fig. 3.
Figure 3:
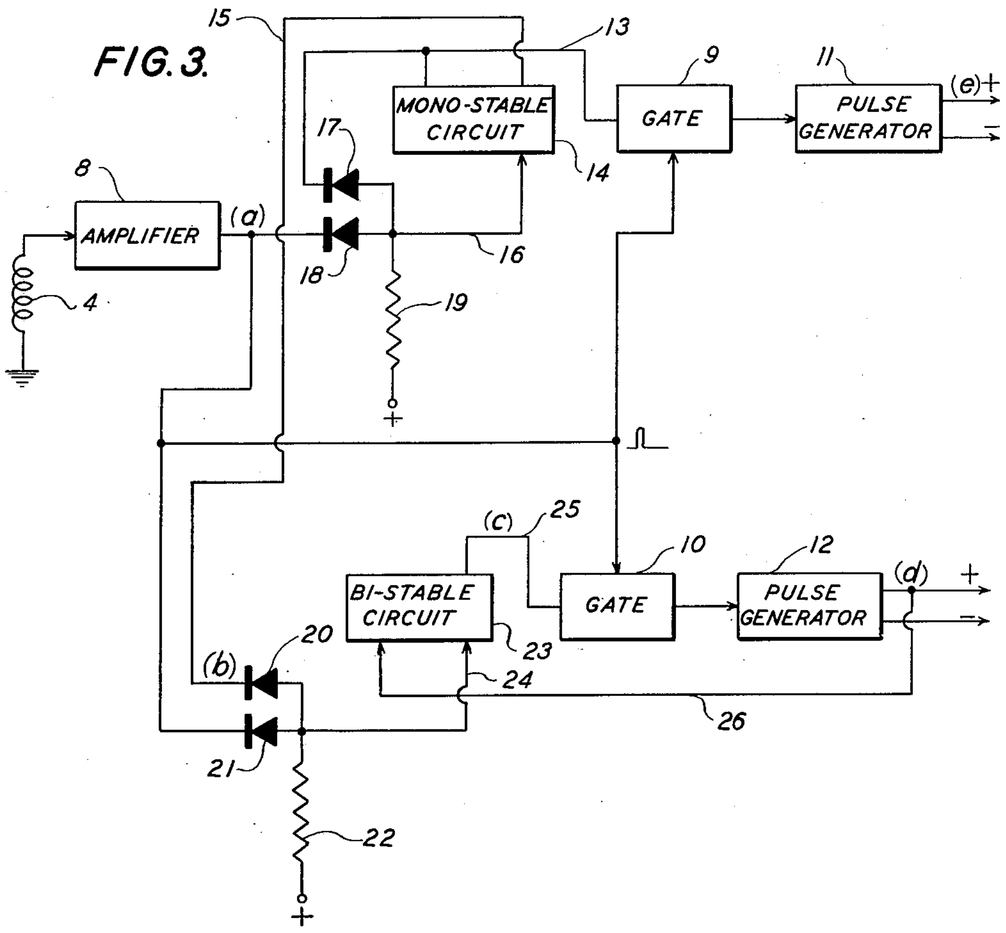
Fig. 3 is a combination block and circuit diagram of an illustrative embodiment of signal generating apparatus for generating a plurality of timing signals from signals derived from a single timing channel.

In Fig. 3 there is shown apparatus for generating a plurality of sets of timing signals from a signal train comprising periodically recurrent signals and flag signals. The winding 4 of Fig. 3 corresponds to the winding 4 of the transducer 3 of Fig. 1. Across the winding 4 there is generated a signal train as shown in Fig. 4(*a*) corresponding to the indicia recorded on a timing track. This signal train is amplified by a conventional amplifier 8 and applied to a gate 9, and a gate 10. The gate 9 is connected to a pulse generator 11 and likewise, the gate 10 is connected to a pulse generator 12. The pulse generators 11 and 12 are adapted to generate electrical impulses corresponding to the timing signals passed by their respective gates. Each of the pulse generators 11 and 12 may be conventional and is adapted to provide output impulses having a desired wave shape as shown in Figs. 4(*d*) and 4(*e*). The impulses appearing at the output of the pulse generator 11 correspond to the periodically recurrent signals appearing across the winding 4 only. In contrast, the impulses appearing at the output of the pulse generator 12 correspond to selected ones of the periodically recurrent signals which are designated by the flag signals appearing across the winding 4.

The manner in which the gate 9 operates to pass only the timing signals corresponding to the periodically recurrent timing signals to the pulse generator 11 will be considered first. The gate 9 is adapted to be open when a relatively high potential gating signal appears on the lead 13 and is adapted to be closed when a relatively low gating signal appears on the lead 13. The gating signal appearing on the lead 13 may be derived from a monostable circuit 14, such as for example, a monostable multivibrator. In its rest or stable condition the monostable circuit 14 provides a relatively high potential on the lead 13 and a relatively low potential on the lead 15.

Therefore, when the first signal of a signal train is passed by the amplifier 8, the gate 9 is open, and as a result, the signal is applied to the pulse generator 11, which in turn generates an output impulse as shown in Fig. 4(*e*). The monostable circuit 14 is placed in its unstable condition of operation in which the lead 13 assumes a relatively low potential and the lead 15 assumes a relatively high potential when a signal appears on the lead 16.

Assuming the monostable circuit 14 is in its stable condition, the potential applied to the diode 17 will be relatively high, thereby maintaining the diode 17 in a relatively nonconductive condition. When no signal appears at the output of the amplifier 8, the diode 18 is rendered conducting, with a resultant voltage drop across a resistor 19. However, when a signal is passed by the amplifier 8, the diode 18 is rendered cut-off, which causes the potential on the lead 16 to rise, which in turn causes the monostable circuit 14 to assume its unstable condition.

Therefore, in operation, the diodes 17 and 18 and the resistor 19 function as an "and" circuit which is adapted to pass signals from the amplifier 8 to the monostable multivibrator 14 when the monostable circuit is in its stable condition and a signal is applied to the diode 18. When the monostable circuit 14 is in its unstable condition, the lead 13 is at a relatively low potential, which closes the gate 9 and renders the diode 17 conducting, thereby maintaining the lead 16 at a relatively low potential.

When the diode 17 is maintained conducting, the "and" circuit holds the lead 16 at a relatively low potential irrespective of the signals passed by the amplifier 8. Therefore, any signal appearing at the output of the amplifier 8 immediately after the appearance of one of the periodically recurrent signals, is not passed by the gate 9. Consequently, the output of the pulse generator 11 corresponds to the periodically recurrent signals occurring across the winding 4 only.

The period after each periodically recurrent signal in which the gate 9 is closed corresponds to the period for which the monostable circuit 14 remains in its unstable state. In the case of a monostable multivibrator, the period is determined by the time constants of the circuit.

Referring to the manner in which selected ones of the periodically recurrent signals are applied to the pulse generator 12 in response to flag signals, there is included in the apparatus an "and" circuit comprising the diodes 20 and 21, a resistor 22, and a bistable circuit 23, which may comprise, for example, a bistable multivibrator. The wave appearing on the lead 15 as shown in Fig. 4(*b*) is applied to the diode 20. Whenever the monostable circuit 14 is in its stable condition, the potential on the lead 15 is relatively low, thereby rendering the diode 20 conducting, which in turn causes a lead 24 to assume a relatively low potential. However, when the monostable circuit 14 is in its unstable condition in which the lead 15 assumes a relatively high potential, the diode 20 is cut-off, and signals passed by the amplifier 8 applied to the diode 21 appear on the lead 24. Therefore, during the period in which the monostable circuit 14 remains in its unstable state, any signal applied to the diode 21 appears on the lead 24 and is applied to one side of the bistable circuit 23.

By positioning the flag signals immediately succeeding the periodically recurrent signals so as to arrive during the period in which the monostable circuit 14 is in its unstable state, the flag signals only will be applied to the bistable circuit 23. Assuming that a flag signal has been applied to the bistable circuit 23, the lead 25 assumes a relatively high potential, which in turn opens the gate 10, thereby allowing a succeeding periodically recurrent signal to pass to the pulse generator 12, which in turn provides an output impulse as shown in Fig. 4(*d*). Therefore, when a flag signal occurs after a periodically recurrent signal during the period of the monostable circuit 14, there is provided an output impulse at the output of the pulse generator 12 corresponding to the next succeeding periodically recurrent signal.

Although the circuitry may be arranged so that any selected number of successive signals may be passed by the gate 10 to the pulse generator 12, the apparatus of Fig. 3 is arranged to allow only one recurrent signal to be passed by the gate 10. In order to limit the number to one, an impulse from the output of the pulse generator 12 is applied to the bistable circuit 23 via a lead 26, thereby causing the bistable circuit 23 to assume its initial stable state in which the lead 25 assumes a relatively low potential, thereby maintaining the gate 10 closed. In the case where the gate 10 is closed after only one periodically recurrent signal is passed, the wave derived from the bistable circuit 23 is as shown in Fig. 4(*c*).

Therefore, in overall operation the apparatus of Fig. 3 is arranged to receive a composite signal train including periodically recurrent signals and flag signals, and to provide at a first output, impulses corresponding to the periodically recurrent signals only, and at a second output a single impulse immediately succeeding the flag signal which is synchronized with the periodically recurrent signal.

It will be appreciated that the apparatus of Fig. 3 may be used with a timing track in which there is recorded any number of flag signals which may be used to cause the gate 10 to open to pass signals identifying zones of the recording medium. However, if only one flag signal is included on the cyclical storage medium, the apparatus may be used to generate a signal which designates a reference point or origin on the cyclical storage medium. In contrast, if a plurality of flag signals are included in the signal train, output impulses may be generated as a result of the flag signals which designate zones or addresses on a storage medium. As noted above, these impulses may be used to identify blocks of information recorded along the storage medium.

Through the use of the improved method and apparatus of the present invention, as for example in the illustrative embodiment of Fig. 3, there may be generated a plurality of sets of timing impulses from a single timing track. Although the apparatus of Fig. 3 has been adapted to generate two sets of timing impulses only, it will be appreciated that the principles embodied therein may be adapted for use where more than two sets of timing impulses are to be generated. For example, the gate 10 might be replaced by a plurality of gates which are sequentially energized by a counter. By stepping the counter with the appearance of either the flag signals or the periodically recurrent signals, different portions of the storage medium may be selected for sensing the presence or absence of a flag signal. By this means, designated ones of the periodically recurrent signals identified in accordance with the presence or absence of a flag signal, may be passed to a selected output circuit.

I claim:

1. A system for generating a plurality of sets of timing signals in response to signals derived from a single channel of a storage medium, in which there is recorded a set of periodically recurrent timing signals and at least one flag signal which is interspersed with respect to said periodically recurrent signals, including in combination means generating from a single output a signal train corresponding to the signals recorded in said single channel of said storage medium, a first gate connected to the single output of said signal generator for passing signals corresponding to said recorded periodically recurrent signals only, a second gate coupled to said signal generating means, and means opening said second gate for a predetermined period succeeding each of said flag signals, whereby the next succeeding one of the periodically recurrent signals is passed by the second gate.

2. In a system for generating timing signals, including a single timing track upon which is recorded a set of periodically recurrent signals along with at least one flag signal interspersed with respect to said periodically recurrent signals, the combination of means generating electrical signals corresponding to the signals recorded on said timing track; a monostable multivibrator having a stable state and an unstable state; means placing said monostable multivibrator in its unstable state in response to signals from said signal generating means; a bistable multivibrator having a first stable state and a second stable state; means coupled between said signal generating means and said bistable multivibrator for placing said bistable multivibrator in its second stable state in response to a signal from said signal generating means, and said monostable multivibrator being in its unstable state; a first output circuit; means passing signals from said signal generating means to said first output circuit when said monostable multivibrator is in its stable state; a second output circuit; and means passing signals from said signal generating means to said second output circuit when said bistable multivibrator is in its second stable state.

3. Apparatus in accordance with claim 2, in which said bistable multivibrator is placed in its first stable state in response to a signal appearing in said second output circuit.

4. In a system for generating timing impulses, including a single timing track in which there is recorded a set of periodically recurrent signals and at least one flag signal interspersed in time with respect to said periodically recurrent signals, the combination of means generating signals corresponding to the signals recorded in said single timing track; a monostable multivibrator having a stable state; a first "and" circuit connected between said signal generating means and said monostable circuit, said first "and" circuit being adapted to place said monostable multivibrator in its unstable state in response to said monostable multivibrator being in its stable state and a signal being provided by said signal generating means; a first output circuit; a first gate connected between said signal generating means and said first output circuit; means opening said gate when said monostable multivibrator is in its stable state; a bistable multivibrator having a first stable state and a second stable state; a second "and" circuit having one input connected to said signal generating means, a second input connected to said monostable multivibrator, and an output connected to said bistable multivibrator, said second "and" circuit being adapted to place said bistable multivibrator in its second stable state in response to said monostable multivibrator being in its unstable state and a signal provided by said signal generating means; a second output circuit; a second gate connected between said signal generating means and said second output circuit; means opening said second gate when said bistable multivibrator is in its second stable state; and means placing said bistable multivibrator in its first stable state in response to a signal appearing in said second output circuit.

5. In a system for generating timing signals, the combination of a signal source including means generating a set of periodically recurrent signals, and means generating flag signals which are interspersed in time with respect to said periodically recurrent signals, the periodically recurrent signals and the flag signals occurring serially from a common output of the signal source, means for separating the flag signals from the recurrent signals including gating means coupled to the output of the signal source which is triggered open by each of the recurrent signals for a period less than the interval between the recurrent signals, whereby the gating means passes only the interspersed flag signals, a first output circuit, means gating only said periodically recurrent signals to said first output circuit, a second output circuit, and means gating selected ones of said periodically recurrent signals to said second output circuit in response to said flag signals.

6. Apparatus for generating sets of timing pulses from a single train of pulses, wherein the train of pulses includes a set of periodically recurrent pulses and interspersed flag pulses, said apparatus including a normally open gate and a normally closed gate to which the single train of input pulses are coupled, means coupled to the output of the normally open gate for biasing the normally open gate closed and the normally closed gate open for an interval slightly less than the time interval between pulses in said set of periodically recurrent pulses, whereby the interspersed flag pulses are not passed by the normally open gate but are passed by the normally closed gate, an additional normally closed gate having the input pulse train coupled thereto, and delay means responsive to the flag pulse passed by said normally closed gate for biasing open said additional gate at the time of occurrence of the next pulse of the set of periodically recurrent pulses following the flag pulse, whereby only the periodically recurrent pulses are derived from the normally open gate and only periodically recurrent pulses following in point of time a flag pulse are derived from said additional normally closed gate.

References Cited in the file of this patent

UNITED STATES PATENTS 2,656,407 Herrick et al. ---------- Oct. 20, 1953